UNITED STATES PATENT OFFICE.

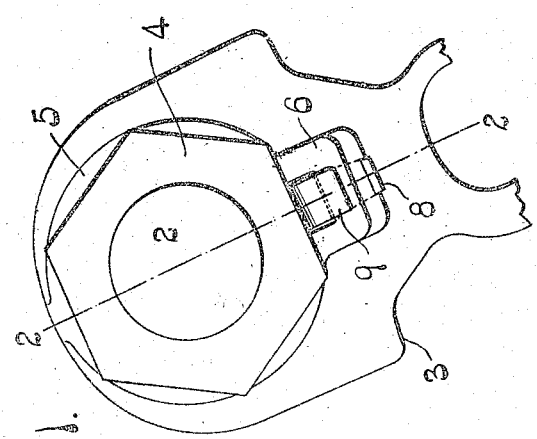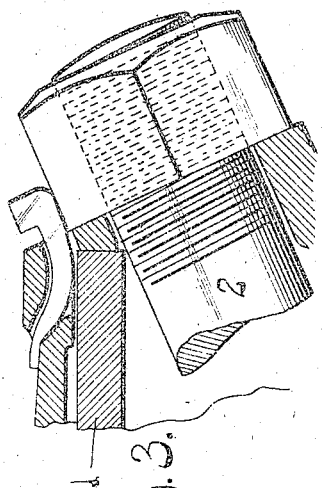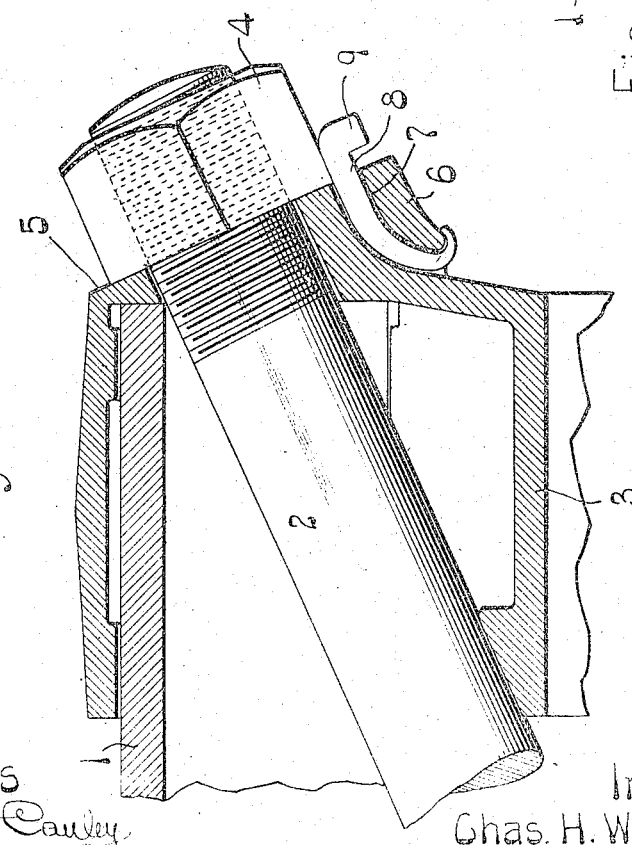

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION.

BRAKE-BEAM DETECTOR.

No. 931,005.   Specification of Letters Patent.   Patented Aug. 10, 1909.

Application filed June 3, 1909. Serial No. 499,912.

*To all whom it may concern:*

Be it known that I, CHARLES H. WILLIAMS, Jr., a citizen of the United States, residing at Chicago, Illinois, have invented a certain new and useful Improvement in Brake-Beam Detectors, of which the following is a full, clear, and exact description, such as will enable others skilled in the art to which it appertains to make and use the same, reference being had to the accompanying drawings, forming part of this specification, in which —

Figure 1 is an end elevation of a trussed brake beam, showing my improved detector applied thereto; Fig. 2 is a vertical section on the line 2—2 of Fig. 1; Fig. 3 is a section similar to Fig. 2, showing a modified form of the detector.

My invention relates generally to trussed brake beams wherein a compression member, a tension member and a strut are combined, which compression member is cambered in order to obtain the necessary strength and rigidity.

In brake beams of the class above referred to, the camber is imparted to the compression member during the assembling of the various parts of the beam by screwing up the nuts on the ends of the tension member, and it is the principal object of my invention to provide simple means on the beam which will serve as a detector to indicate any unauthorized tampering with the camber of the beam after the same has been finally adjusted, which tampering frequently takes place in attempts to take up or obtain slack in hanging the beams. With this object in view, I propose to provide a key of frangible material, which not only serves the purpose of a detector but which also acts as a nut lock when properly applied to the brake head and which detector keys must be broken and removed before the nuts can be removed from the tension member. It has heretofore been the practice in some instances to make use of a combined detector plate and nut lock in the form of a washer interposed between the nut and the outer face of the brake head, but such construction has been found objectionable, inasmuch as it offers another joint which by reason of wear in time produces lost motion, thereby materially affecting the camber in the compression member. I propose to remedy these defects by locating a key in a perforated lug on the brake head, which key forms an effective detector and an efficient nut lock.

To the above purposes, my invention consists in certain novel features of construction and arrangement of parts hereinafter more fully described and claimed.

Referring by numerals to the accompanying drawings, 1 designates the compression member, 2 the tension member, 3 the brake head located in the usual manner upon the meeting ends of the compression and tension members, and 4 the nut located on the threaded end of the tension member and bearing against a corresponding seat 5 formed on the outer face of the brake head 3.

Formed integral with the outer portion of the brake head adjacent the opening through which the tension member passes is a lug 6 provided with a perforation 7, which latter is preferably curved and having one end occupying an angle relative to the opposite end.

8 designates the detector, which is formed of frangible material or material which will readily break upon being bent after having been bent initially, said detector being in the form of a key having a tapered body portion provided on its larger end with a head 9.

After a brake beam is assembled and the nuts 4 are properly tightened on the ends of the tension member 2, to impart the proper camber to the compression member each nut is turned so as to bring one of its side faces in alinement with the inner edge of the perforation 7. One of the detectors is now driven through the perforation 7 and the projecting end of said detector is bent around the end of the lug, as shown in Fig. 2, thus firmly anchoring or fixing the detector in the perforated lug and also locking the nut 4 in its set position. When the detector is so positioned, the nut 4 cannot be removed without bending and therefore breaking the detector key, and thus any tampering with the camber of the beam will at once be detected.

The perforated lug 6 can be located adjacent the inner edge of the brake head, as shown in Fig. 2, or adjacent the outer edge as shown in Fig. 3. The detector keys are preferably made of soft steel, or analogous material which will readily break upon attempted removal after said keys have once been seated.

I claim:

1. A detector for brake beams, consisting of a key of frangible material adapted to be seated in a perforation formed in the brake head of the beam and to engage against the nut located on the end of the compression member of said beam.

2. In a trussed brake beam, the combination with the brake head provided with a perforation, of a combined detector and nut lock seated in said perforation and adapted to engage against the nut located on the end of the tension member of the beam.

3. In a trussed brake beam, the combination with the brake head provided with a curved perforation, of a combined detector and nut lock seated in said curved perforation and adapted to engage against the nut located on the end of the tension member of the beam.

4. In a trussed brake beam, the combination with the brake head provided with a lug having a curved perforation, of a frangible key adapted to be inserted in said perforation, and a portion of which key engages against the nut located on the end of the tension member of the beam.

5. A detector for trussed brake beams, comprising a tapered body of frangible material, and a head formed on one end of said body.

6. A detector for trussed brake beams, comprising a key formed of frangible material, and a head formed on one end thereof.

7. In a trussed brake beam, the combination with the brake head provided with a key seat, of a detector of frangible material anchored in said key seat, and the head of which detector engages against the nut located on the end of the compression member of the beam.

8. In a trussed brake beam, the combination with the brake head provided with a key seat, one end of which occupies a plane at an angle relative to the plane occupied by the opposite end of said seat, of a frangible detector seated in said key seat, and one end of which detector bears against the nut located on the end of the tension member of the beam.

9. A detector for brake beams, comprising a key of frangible material adapted to be anchored in a seat formed in the brake head of the beam, and a projecting portion of which key bears against the nut located on the compression member of the beam.

In testimony whereof I hereunto affix my signature in the presence of two witnesses, this 26th day of May, 1909.

CHARLES H. WILLIAMS, Jr.

Witnesses:
E. T. WALKER,
J. W. WEINLAND.